(12) United States Patent
Donahue

(10) Patent No.: US 8,075,982 B2
(45) Date of Patent: Dec. 13, 2011

(54) DEVICE FOR MAKING ILLUMINATED MARKINGS

(76) Inventor: Kevin Gerard Donahue, Harvard, MA (US)

( * ) Notice: Subject to any disclaimer, the term of this patent is extended or adjusted under 35 U.S.C. 154(b) by 871 days.

(21) Appl. No.: 10/988,714

(22) Filed: Nov. 15, 2004

(65) Prior Publication Data

US 2006/0105149 A1   May 18, 2006

(51) Int. Cl.
*B32B 3/00* (2006.01)
(52) U.S. Cl. .............. 428/195.1; 428/198; 434/410; 362/602; 362/612; 362/617
(58) Field of Classification Search .............. 428/195.1, 428/198; 385/146; 434/408, 410, 412; 362/602–605, 611, 612, 615–628, 552, 555
See application file for complete search history.

(56) References Cited

U.S. PATENT DOCUMENTS

| | | | |
|---|---|---|---|
| 3,149,425 A * | 9/1964 | Barish | 434/410 |
| 3,279,100 A | 10/1966 | Knott | |
| 3,579,871 A | 5/1971 | Eddington | |
| 3,793,217 A * | 2/1974 | Janssens et al. | 252/589 |
| 3,879,611 A | 4/1975 | Schroeder | |
| 3,911,430 A * | 10/1975 | Jankowski et al. | 340/815.42 |
| 3,947,106 A * | 3/1976 | Hamaguchi et al. | 355/1 |
| 3,978,340 A | 8/1976 | Schroeder | |
| 4,011,665 A | 3/1977 | Port | |
| 4,035,652 A | 7/1977 | Schroeder | |
| 4,051,609 A | 10/1977 | Boursaw | |
| 4,590,381 A | 5/1986 | Mendelson | |
| 4,679,909 A | 7/1987 | Hamada et al. | |
| 4,888,874 A | 12/1989 | Oster | |
| 4,927,748 A | 5/1990 | Kinberg | |
| 4,988,301 A | 1/1991 | Kinberg | |
| 5,083,242 A | 1/1992 | Piotrowski | |
| 5,098,502 A | 3/1992 | Smolinski | |
| 5,151,679 A * | 9/1992 | Dimmick | 340/326 |
| 5,163,748 A * | 11/1992 | Messinger | 362/98 |
| 5,207,493 A * | 5/1993 | Murase et al. | 362/623 |
| 5,249,969 A | 10/1993 | Confalone et al. | |

(Continued)

FOREIGN PATENT DOCUMENTS

JP   362182721 A   2/1986

(Continued)

OTHER PUBLICATIONS

Machine translation of Claims of JP 07-273854 A. Imported as JP07_273854clm.pdf.*

(Continued)

*Primary Examiner* — Gerard Higgins
(74) *Attorney, Agent, or Firm* — Kriegsman & Kriegsman

(57) ABSTRACT

A pressure-sensitive light-extracting drawing surface including a light guide operable to receive a light source, wherein light is extracted from a light guide when pressure is applied to the drawing surface by a marking instrument. A resultant light-emitting drawing can be erased or can be made permanent. An optional multi-layered film disposed on the light guide allows drawings to be created in fluorescent, luminescent, phosphorescent, or photochromic colors. A background sheet containing designs may be inserted behind the light guide. The drawing surface can be embodied as a pressure-sensitive light-extracting "paper." The invention may be embodied as a drawing tablet, a drawing tablet add-on to a modular graphic display device, or a toy drawing tablet for tracing alphabets, numerals, and characters from comic books, cartoons, and movies.

30 Claims, 8 Drawing Sheets

U.S. PATENT DOCUMENTS

| | | | |
|---|---|---|---|
| 5,284,445 A | 2/1994 | Dietterich et al. | |
| 5,301,982 A | 4/1994 | Brotz | |
| 5,321,891 A | 6/1994 | Arad et al. | |
| 5,324,202 A | 6/1994 | Meyers et al. | |
| 5,368,489 A | 11/1994 | Confalone et al. | |
| 5,381,310 A | 1/1995 | Brotz | |
| 5,441,418 A | 8/1995 | Brown | |
| 5,471,371 A * | 11/1995 | Koppolu et al. | 362/555 |
| 5,607,223 A | 3/1997 | Brotz | |
| 5,668,913 A * | 9/1997 | Tai et al. | 385/146 |
| 5,775,914 A | 7/1998 | Smith | |
| 5,860,235 A | 1/1999 | Bilbie et al. | |
| 5,938,449 A | 8/1999 | Masson | |
| 6,092,294 A | 7/2000 | Mak | |
| 6,113,150 A | 9/2000 | Kinberg | |
| 6,450,539 B1 | 9/2002 | Bilbie et al. | |
| 6,481,127 B1 | 11/2002 | Bilbie et al. | |
| 6,578,615 B1 | 6/2003 | Bronson | |
| 6,595,826 B2 | 7/2003 | Koizumi | |
| 6,666,742 B2 | 12/2003 | Koizumi | |
| 6,676,411 B2 | 1/2004 | Rehkemper et al. | |
| 6,722,891 B1 | 4/2004 | Ma | |
| 2001/0038999 A1 | 11/2001 | Hainey, II | |
| 2003/0112623 A1 | 6/2003 | Yu Sun et al. | |
| 2003/0157472 A1 | 8/2003 | Castillo et al. | |
| 2003/0194944 A1 | 10/2003 | Koizumi | |
| 2004/0115610 A1 | 6/2004 | Mak | |
| 2004/0135097 A1 | 7/2004 | Shibahashi et al. | |

FOREIGN PATENT DOCUMENTS

| | | | |
|---|---|---|---|
| JP | 401038743 A | | 8/1987 |
| JP | 64038743 | | 2/1989 |
| JP | 403067240 A | | 8/1989 |
| JP | 403248151 A | | 2/1990 |
| JP | 403261942 A | | 3/1990 |
| JP | 403261943 A | | 3/1990 |
| JP | 03248151 A | | 11/1991 |
| JP | 407314981 A | | 5/1994 |
| JP | 07273854 A | * | 10/1995 |
| JP | 07314981 A | | 12/1995 |
| JP | 2003177491 A | | 6/2003 |
| JP | 2003222971 A | | 8/2003 |
| WO | 01/83067 A3 | | 11/2001 |

OTHER PUBLICATIONS

Machine translation of Detailed Description of JP 07-273854 A. Imported as JP07_273854detail.pdf.*

Vitex Systems (http://www.vitexsys.com/new//barix.htm).

Graphics Tablets (http://en.wikipedia.org/wiki/Graphics_tablet, Mar. 26, 2008).

PCT International Search Report dated Jun. 13, 2008 (PCT/US05/39080).

PCT Written Opinion of the International Searching Authority dated Jun. 13, 2008 (PCT/US05/39080).

* cited by examiner

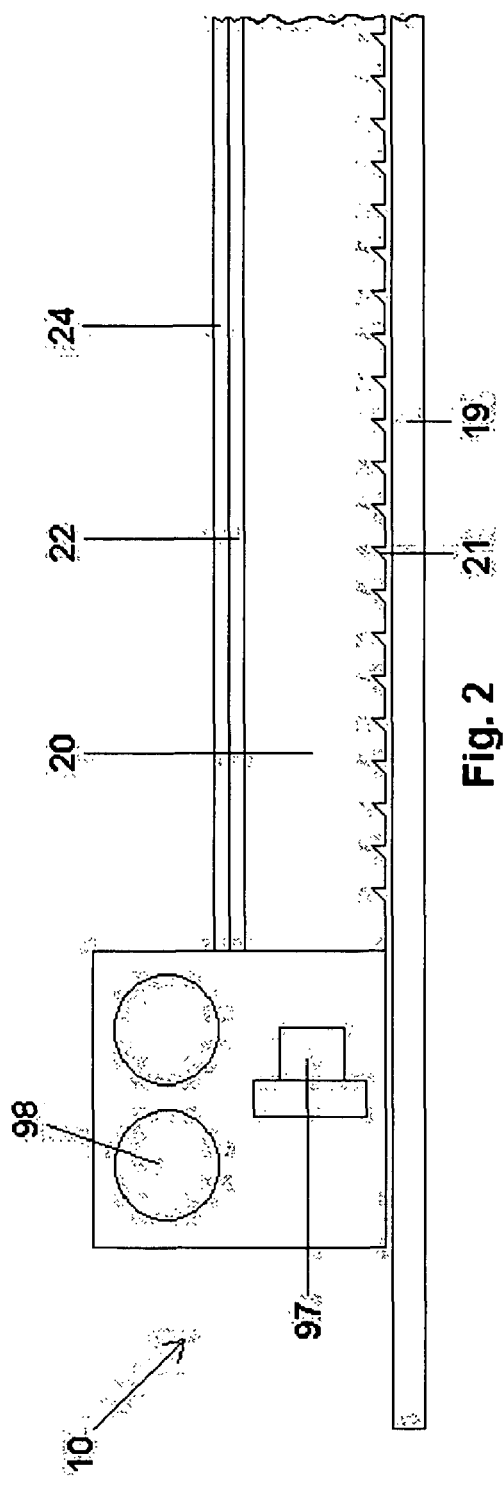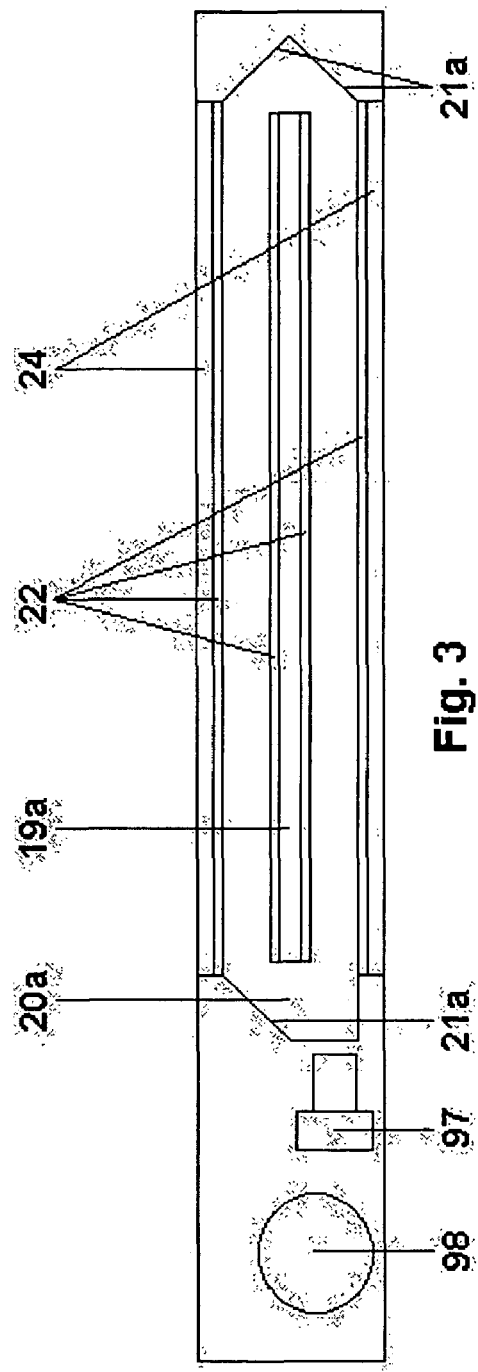

DEVICE FOR MAKING ILLUMINATED MARKINGS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Copyright 2004, Donahue Labs, Inc.

CROSS REFERENCE TO RELATED APPLICATIONS

U.S. patent application No. 10/939,203 titled "Modular Graphic Display Device" filed on Sep. 10, 2004.

BACKGROUND OF THE INVENTION

1. Field of the Invention

The present invention relates to drawing and writing devices. More specifically, the invention relates to illuminated drawing surfaces, tablets, and boards.

2. Description of Prior Art

Drawing and writing tablets and boards have existed for generations. Examples include chalk boards, white boards, mechanically-aided drawing devices, clipboards with side or back illumination, magnetic drawing tablets, fluorescent ink pens, luminescent tablets, phosphorescent tablets, thermochromic tablets, and pressure-sensitive tablets using plastic film and wax. There are several patents that discuss such tablets and boards for drawing and writing.

U.S. Pat. No. 3,279,100 issued to Knott and titled "Exhibitor of Informative Markings Removably Applied by Pressure to a Display Surface Thereof", discloses a pressure-sensitive drawing tablet using multiple layers of wax and plastic which allows displays in color by shifting a backing surface printed with a grid of red, yellow, and blue squares.

U.S. Pat. No. 3,579,871 issued to Eddington and titled "Record book", discloses in the Abstract: "A record book comprising a plurality of leaves wherein each leaf is centrally divided in the transverse direction with separate writing sections located on each side of the division. Each writing section includes a series of longitudinal separate writing spaces, each space having a wax backing with an opaque writing strip covering the backing and a clear plastic outside cover over the writing strip. The writing strip of each space can be removed from in contact with the wax backing. The stylus is to be retained when not in use within a hinge connection which maintains the entire book in the closed, not-in-use position." This record book uses multiple layers of wax and plastic allowing different sections of writing to be separately erased. This record book is not illuminated.

U.S. Pat. No. 4,051,609 issued to Boursaw and titled "Method of Making Reusable Writing Board and the Product Thereof", discloses in the Abstract: "A reusable writing board of 'slate board' is both improved and of lower cost, avoiding use of the usual separate black-cardboard piece stapled to a backing. In a single printing operation, which is needed for face-printing anyway, the 'slate' or background surface is provided on the same piece of paperboard. After further machine steps, a final operation of gluing and folding produces the finished slate board with a decoratively-printed head panel glued to extend down protectively over the top edge of the plastic work sheet covering the printed background. If desired, educational or informative discs can be rotatably secured under the head fold. Also, if desired, an air pocket can be formed under the head fold such that after writing by impressions through the work sheet, a sudden slap on the cover of the air pocket will raise the work sheet pneumatically to erase the writing." This method describes an improved manufacturing process for producing a reusable writing board using multiple layers of wax and plastic allowing erasure with a slap on the cover of the board. The writing board, however, is not illuminated.

U.S. Pat. No. 4,590,381 issued to Mendelson and titled "Phosphorescent Marking System", discloses in the Abstract: "A device of phosphorescent material on which luminescent images are formed and retained for a period of time is disclosed. The device includes phosphorescent material in the form of a sheet mounted on a support. The support exposes the top surface of the phosphorescent material to activating light. A shield maintains deactivation of the phosphorescent material. Upon removal of the shield in a dark area, the phosphorescent material may be activated in selected areas to form an image which is retained for a period of time until the phosphorescent material has decayed to an inactivated state of imperceptible level of luminescence. This type of device is particularly suited to amusement and educational items for children. However, it is also useful in industrial applications where writing and communication of information in the dark is necessary." The marking system describes using a light pen to form an image on a sheet of phosphorescent material. A shield that blocks light of the activating wavelength of the phosphorescent material is placed above the sheet to ensure that the sheet remains in a deactivated state, or, in the event that the sheet has been activated, that the deactivation of the phosphors proceeds unperturbed. The system can only be used in a dark area, requires a light pen, and involves constant covering and uncovering of the phosphorescent sheet.

U.S. Pat. No. 4,888,874 issued to Oster and titled "Drawing Device Having Mobile Stylus Tracing Lines on Glass Plate", discloses in the Abstract: "A toy drawing device in which a window in a housing containing powder is covered by a glass plate whose edges are received within a groove in a sectioned rim joined to a window frame to prevent leakage of powder therefrom. A mobile stylus under the control of an operator acts to trace lines on a layer of powder adhering to the undersurface of the glass plate. To prevent injuries should the glass plate break, its outer surface is shielded by a transparent protective film formed of heat-formable, synthetic plastic material." A mechanically-controlled stylus is used to trace lines on the underside of a glass screen to which a powdered substance adheres. The glass screen is shielded by a transparent protective film to prevent injury due to a break in the glass. The device, however, is not illuminated, is bulky and heavy, and is expense to manufacture.

U.S. Pat. No. 4,927,748 issued to Kinberg and titled "Luminescent Writing or Display Device", discloses in the Abstract: "A display or writing slate capable of producing luminescent images upon the application of pressure thereon which can be readily erased and repeatedly used that includes a pair of over-lying sheets, one of which is translucent or transparent, containing a luminescent dye or pigment and the other of which is opaque, and which sheets have a smooth surface at their interface. At least one of the sheets is formed of a pliable plastic with its interface surface tending to adhere to the interfacing surface of the other sheet when a pressure is applied thereto to produce the luminescent images. The improvement resides in the incorporation of a non-migrating dye or pigment in the translucent or transparent sheet so as to resist the migration of the luminescent dye or pigment from the translucent or transparent sheet to the interface surface of the other sheet." This patent describes a writing device where pressure from a stylus onto a translucent sheet containing a luminescent dye produces a luminescent image. While the device displays an image through luminescence, the device does not allow for enhanced color, brightness, and contrast.

Japanese Pat. 03248151A issued to Takeshi et al. and titled "Method for Writing and Erasing Using Photochromic Board and Photochromic Board for the Purpose", discloses in the Abstract: "To allow writing and erasing to and from a photochromic board from a distant position by irradiating the photochromic board with a beam for a $1^{st}$ wavelength to allow the photochromic material to develop a color and to write characters, etc., and casting hot air or light of a $2^{nd}$ wavelength to the color developed part to erase the written characters, etc." The writing surface of the board contains a photochromic compound and the writing instrument is a wand that emits light of activating and deactivating wavelengths of the photochromic compound. The device uses a beam of light from a wand to create characters in photochromic color, but does not allow for enhanced color, brightness, and contrast.

U.S. Pat. No. 5,083,242 issued to Piotrowski and titled "Illuminated Underwater Writing Tablet", discloses in the Abstract: "An illuminated underwater writing tablet having an elongated tubular lightsource housing and an elongated tablet sheet of Plexiglass material. The lightsource housing has an elongated slot in its bottom surface that receives the top edge of the tablet sheet. A chemically activated light stick is removably stored in the light source housing and when it is activated it will illuminate the tablet sheet by directing light through its interior. A grease stick is tethered to one end of the lightsource housing. An end cap is tethered to the other end of the lightsource housing." This writing tablet describes a plastic tablet sheet, a tubular light source housing, a chemically activated lightstick stored in the housing, and a grease pen. The writing tablet displays an image through a chemically activated lightstick.

U.S. Pat. No. 5,321,891 issued to Arad et al. and titled "Drawing Device", discloses in the Abstract: "This invention relates to an apparatus for writing or drawing that is characterized by an enclosed case having a front side and a back side and in which the front side consists of a transparent screen. Disposed within a substantially rectangular case is a slightly adhesive powder which adheres to the undersurface of the transparent screen so as to render it opaque. A first and second stylus is mounted within the case for producing relatively thick and relatively thin lines by movement along the undersurface of the transparent screen in a manner for removing the adhesive powder and to thus produce lines. The first and second stylus are both moved in the X and Y coordinates through the use of external horizontal and vertical line control knobs which are internally coupled to the multiple stylus by first and second transverse rods, each being supported on and attached to a separate cable loop system. The multiple stylus may be fixedly withdrawn from the screen by actuation of the retraction thus enabling the operator to use both hands for moving the stylus to a second horizontal and/or vertical position on the screen without production of a line from the first to the second writing or drawing." Two mechanically-controlled styluses are used to trace thick and thin lines on the underside of a transparent screen to which a powdered substance adheres. The powder lines can be erased by gently shaking the drawing device. The device is not illuminated, and is bulky, heavy, and expense to manufacture.

U.S. Pat. No. 5,324,202 issued to Meyers et al. and titled "Luminescent Display and Copying Apparatus and Method for Using Same", discloses in the Abstract: "An apparatus and method for providing a luminescent display by applying pressure to a transparent planar sheet containing a luminescent dye or pigment where such pressure is sufficient to cause one smooth surface of the transparent sheet to contact a facing smooth surface of an opaque planar sheet, the smooth surfaces of the transparent and opaque sheets tending to adhere together at the area of contact, thereby creating a luminescent image at the area of contact which can be selectively erased by separating the smooth surfaces of the transparent and opaque sheets at the area of contact, and for allowing copying of the image by positioning a sheet of carbon paper between the opaque sheet and a sheet of plain paper so that the application of pressure to the transparent sheet causes pressure to be applied through the carbon paper to the sheet of plain paper, thereby copying the image displayed on the transparent sheet onto the sheet of plain paper, the carbon paper being selectively movable to allow segments of carbon paper which can produce images of different colors to be positioned between the opaque sheet and the sheet of plain paper during the drawing of an image to facilitate the production of a multicolored copy of the displayed image, the apparatus allowing the use of different sizes and multiple sheets of plain paper and providing means for ejecting such paper from the apparatus." The apparatus displays an image through luminescence only, and does not allow for enhanced color, brightness, and contrast.

U.S. Pat. No. 5,368,489 issued to Confalone et al. and titled "Luminescent Display Device", discloses in the Abstract: "A luminescent writing or display device and method of manufacturing the same which includes a transparent vinyl sheet containing a fluorescent or neon dye and an opaque sheet made from coated paperboard stock. An acrylic resin varnish is provided on a portion of the paperboard stock for forming a contact surface with the vinyl on which an image may be created by applying pressure thereto. The image is readily erased by separating the sheets. Another portion of the paperboard stock receives printing inks for providing a permanent ink display on a header portion of the device. The device may be manufactured in a continuous process at a reduced cost." The device displays an image through luminescence only, but does not allow for enhanced color, brightness, and contrast.

U.S. Pat. No. 5,441,418 issued to Brown and titled "Thermochromic Drawing Device", discloses in the Abstract: "A thermochromic drawing device is disclosed which can be marked and erased by selectively changing the temperature of its drawing surface. The drawing surface of the drawing device consists of a flexible substrate printed with thermochromic inks having at least two color states. The flexible substrate has low thermal mass thereby enabling it to readily assimilate temperatures induced by a user and, consequently, facilitating the transition of the thermochromic inks from one color state to another. The drawing surface is further provided with an insulating layer which isolates the flexible substrate from unwanted heat sinks and heat sources thereby preventing unwanted color transitions of the thermochromic inks. Thus, a user can selectively change the color state of portions of the drawing surface to create distinctive markings." The device comprises of a substrate coated with thermochromic inks, a heat insulating layer underneath the substrate, and a pen containing a cooling substance and a heat conducting tip. The cool tip of the pen in contact with the thermochromic substrate creates the drawing, which can be erased by the user placing his hand over the drawing. The device displays an image through thermochromic inks only, and does not allow for enhanced color, brightness, and contrast through illumination.

Japanese Pat. 07314981A issued to Kazuo and titled "Display Board and Writing Instrument for Display Board", discloses in the Abstract: "To erase a part to be deleted in a single tracing pass by making the light projection width of a deletion pen larger than the light projection width of a writing pen, using a writing sheet of a photochromic material." A photochromic writing tablet is used with a writing pen and a deletion pen. The writing pen emits a UV light that activates the photochromic material, whereas the deletion pen emits white light that erases the photochromic writing. The tip of the deletion pen is wider than the tip of the writing pen, thereby allowing the deletion pen to erase a line of writing with one stroke. The device uses a light-emitting pen of activating wavelength to create characters in photochromic color only.

U.S. Pat. No. 5,607,223 issued to Brotz and titled "Illuminated Clipboard with Movable Writing Surface", discloses in the Abstract: "An illuminated clipboard for use by a seated individual in dark surroundings with structure to attach the clipboard to a leg of the user, such clipboard having a light-emitting body in one embodiment with means to illuminate therethrough utilizing a sheet of illuminated material disposed thereunder and a translucent roll of film or paper on a spool which is passed from a storage roller to a take-up roller over the active writing surface of the light-emitting planar surface in immediate contact therewith such that indicia or writing thereon is visible to the user by backlighting from the underlying illuminated planar body." A clipboard with a contoured back is attached to a leg of the user for writing using a pencil or pen on a translucent sheet. The sheet is illuminated by a backlighting panel, but is not erasable.

U.S. Pat. No. 5,938,449 issued to Masson and titled "Reusable Writing Board with Locking Function", discloses in the Abstract: "A pressure sensitive reusable writing board is provided which includes a backing member that includes an upper section that folds down over the lower section that accommodates the wax layer and polyester writing sheet. As a result, the upper section provides a protective cover for the lower section. A distal edge of one of the upper or lower sections includes a loop which is in registry with a slot disposed in the distal edge of the other of the upper or lower sections. As a result, when the board is folded together to assume a closed position, the loop may be folded forward through the slot disposed in the opposing section or panel and the stylus may be inserted through the loop to lock the board into a closed position. As a result, any writing or artwork made on the reusable writing surface can be preserved while the board is being transported or handled." The writing surface consists of a wax layer covered with a polyester film. Pressure from a stylus on the polyester film creates a drawing that is not illuminated.

U.S. Pat. No. 6,092,294 issued to Mak and titled "Drawing Board", discloses in the Abstract: "A drawing board having a body and a generally transparent screen on the body. The screen has front and rear sides and contains a viscous opaque liquid and iron dust in the liquid. A magnetic eraser is movable within the body between a rest position away from the rear side of the screen and an operating position against that rear side for operation to move, through magnetic attraction, the iron dust away from the front side of the screen such that the iron dust becomes invisible on the screen. A spring biasses the eraser towards the rest position. A pen having a magnetic tip is used to draw on the screen." The drawing board is not illuminated and requires a magnetically tipped pen.

U.S. Pat. No. 6,113,150 issued to Kinberg and titled "Luminescent Writing Display Device Having Protective Layer", discloses in the Abstract: "A writing and display device for producing luminescent images upon application of pressure thereon which can be readily erased and repeatedly used having a protective layer to prevent damage to the writing surface thereof. The device includes a backing member with a smooth surface over which a translucent or transparent sheet containing a luminescent dye or pigment and an opaque pliable plastic sheet are disposed. At least one of the sheets is formed of a pliable plastic with its interface surface tending to adhere to the interfacing surface of the other sheet when a pressure is applied thereto to produce luminescent images. A pliable, transparent protective sheet is disposed adjacent to and coextensive with the translucent or transparent luminescent sheet. Upon application of pressure onto the protective sheet, which pressure is transmitted to the luminescent sheet by virtue of the pliability of the protective sheet, the interfacing surfaces adhere to each other to thereby produce a luminescent image." This patent describes a pressure-sensitive luminescent sheet. A pliable transparent sheet is placed above the luminescent sheet to prevent puncture and damage to the luminescent sheet from the stylus. Compared to the present invention, this device displays an image through luminescence only on a pressure-sensitive sheet, and does not allow for enhanced color, brightness, and contrast.

U.S. Pat. No. 6,578,615 issued to Bronson and titled "Magic Slate Capture and Display Device", discloses in the Abstract: "A device for forming erasable images on a reusable medium, comprising: an erasing portion; and a writing portion; wherein the erasing portion comprises a separator for separating at least two layers of the reusable medium; and wherein the writing portion comprises automatic machine-driven pressure applicators for applying pressure but no ink to the reusable medium, thereby forming an image on the reusable medium." The display device is not illuminated and is intended primarily for use as a computer-controlled printer.

U.S. Pat. Application 2003/0112623 by Yu Sun et al. and titled "Ultraviolet Light Writing System", discloses in the Abstract: "An ultraviolet light emitting diode flashlight is contained within a housing having a pen tip extending from the housing and an ink or dye reservoir in fluid communication with the pen tip. The ultraviolet light emitting diode flashlight within the housing emits light capable of inducing fluorescence in the ink or dye. A switch assembly completes an electrical circuit between a light emitting diode and a battery to activate the flashlight. A writing system package includes at least two of: a neon or pastel colored writing surface, a security pen having an ink or dye that fluoresces in the visible portion of the light spectrum upon exposure to ultraviolet light, and an ultraviolet light emitting diode flashlight." The system allows visualization of writing in invisible ink during writing, but requires a special fluorescent ink, and the writing is not erasable.

Japanese Pat. 2003222971 issued to Hiroyuki et al. and titled "Method for Displaying Multicolor Image, and Multicolor Image Display", discloses in the Abstract: "To provide a method for displaying a multicolor image and a multicolor image display excellent in resistance to repeated image writing and erasure with light and having good colors of an image" The multicolor image display device uses photochromic compounds as the display media and LED arrays of different activating and deactivating wavelengths. Arrays of LEDs activate and deactivate the photochromic compounds, but the device does not allow for enhanced color, brightness, and contrast.

U.S. Pat. No. 6,666,742 issued to Koizumi and titled "Controlling Light Discharged by a phosphorescent Material", discloses in the Abstract: "A material that phosphoresces may be controlled and the phosphorescence may be terminated when desired. A phosphorescing material may be exposed to an energy source that causes the material to stop phosphorescing. Thus, a pattern may be written on a surface, which is phosphorescing using a coherent energy source. The written pattern, represented by darkened regions, may be recognized by users as a symbol, a graphics or text." The device displays an image on a phosphorescent background, but does not allow for enhanced color, brightness, and contrast.

U.S. Pat. No. 6,722,891 issued to Ma and titled "Magnetic Drawing Board Apparatus"(Ma Apr. 20, 2004) discloses, in the Abstract: "A magnetic drawing apparatus including image forming means, image erasing means, motion generating means, movement control means and a main housing, wherein: the image forming means include a plurality of magnetic cells which collectively define an image forming surface, the magnetic cell contains a viscous fluid and magnetic powder; the image erasing means include a magnetic image eraser which is adjacent to the image forming means, the magnetic image eraser is connected to the motion generating means and is movable relative to the image forming means; and the movement control means include means for actuating the motion generating means and means for selecting the direction of movement of the magnetic image eraser with respect to the image forming means." The drawing board is useful and interesting for children, but the board is not illuminated.

What is needed, therefore, is a drawing and writing paper that overcomes the above-mentioned limitations of the prior art and that: (1) provides bright light-emitting drawings and writings, (2) provides easy-to-read drawings and writings in single or multiple colors, (3) uses a stylus or equivalent pressure-applying device as the marking instrument, (4) is erasable or permanent, (5) is easy to operate, (6) allows for easy insertion of background colors and designs, (7) can be used under day or night lighting conditions, (8) is multipurpose (e.g. toy, bulletin board or white board, used in the dark, under water, in harsh environments), (9) is waterproof, (10) is thin and lightweight in construction, (11) is inexpensive to manufacture.

BRIEF SUMMARY OF THE INVENTION

The present invention includes a pressure-sensitive paper, film, or composite to extract light from a light guide. The invention enables a user to draw or write on a film, covering a light guide, using an inkless stylus. Alternatively, the invention also enables a user to draw on a light guide that will change its shape to include light reflecting angles upon application of pressure, resulting in emission of light. Light emission, via extraction or reflection, provides color, brightness, and contrast needed to create lines of light in a drawing or writing. The light extracting film works when a user applies stylus pressure to a film and binds a bottom surface of the film to an underlying light guide or backlight creating a light emission notch. The notch transmits light to a diffusing surface on the film which emits the light, providing the effect of writing in light. The lighted image or text remains as long as the film is in contact with the light guide. The lighted image or text is erasable by separating the film from the light guide. In the alternative version of the invention, pressure is applied to a light guide that includes light reflecting angles that emit light.

The film or paper can by made using any of several materials or combinations of materials. The film may contain transparent or semi-transparent pigments, transparent or semi-transparent dyes, fluorescent compounds, luminescent compounds, phosphorescent compounds, photochromic compounds, and opaque filters (halftones). Materials can be varied for desired clarity or effects.

The pressure-sensitive material can be embodied in rolls, sheets, pads, or single sheets of the light guide "paper" or media. A pad of paper with multiple sheets can use an insertable rigid plate, for separating sheets, to prevent pressure applied to underlying sheets. Another example is a toy drawing tablet for drawing, writing and/or tracing alphabets, numerals, and drawing upon themed backgrounds.

The light guide design allows use of the latest advances in plastic light guide design and LED technology. Furthermore, the design of this invention allows for low cost manufacturing through the use of plastic injection molding and high-flux LEDs.

The present invention can be used as a toy and in many commercial and military applications such as drawing and writing on a bulletin board or white board, in the dark, under water, and in harsh environments.

Features and Advantages

Recent advances in semiconductor light sources, including the development of high-flux and low-cost light emitting diodes (LEDs), together with advances in light ray modeling and plastic injection molding, have resulted in the development of low-cost devices for guiding light to the surface of a display and for providing backlighting to a transparent or semi-transparent image. The present invention uses the principals of light wave propagation, including Total Internal Reflection, to create drawings or writings on a pressure-sensitive tablet by extracting light from a light guide or by permitting light to be transmitted from a backlight.

A feature of the present invention is that it can provide either permanent or erasable, bright or dull light-emitting, or high contrast drawings and writings. This is achieved by combining a light guide or backlight with a pressure-sensitive light-extracting or light-blocking film. High-flux or low-flux LEDs are used to illuminate the light guide.

Another feature of the invention is the ability to provide drawings and writings in colors by incorporating photo-activated pigments or dyes in the pressure-sensitive film, including fluorescent, luminescent, phosphorescent, and photochromic compounds. Each compound emits a certain colored light when exposed to light of the activating wavelength, usually in the ultraviolet or infrared region. When the light guide is illuminated by an LED of the activating wavelength for a specific compound, pressure from the stylus on the drawing surface will extract light from the light guide into the film, thereby changing the visible light emitted or reflected from that compound. Some of these photo-activated colors are seen by the user as reflected light, which is generally more soothing to the eye than emitted light from a light guide. Depending on the duration of the deactivation time associated with these compounds, termination of the light source can erase the drawing or writing.

Another feature of the invention is the use of a stylus or other pressure-applying and non-transferring pen used as a marking instrument.

Another feature of the invention is that any drawing or writing can be erasable. Erasure is accomplished by breaking the bonds between the light guide and the light-extracting film, such as by peeling away the film from the light guide or by other means. Erasure of drawings or writings on a fluorescent or photochromic film can also be accomplished by turning off the LED light source. For certain phosphorescent and photochromic films, using LEDs of deactivating wavelengths will also erase the drawings or writings on the film. Using only a stylus and being erasable makes the invention very easy to operate.

Another feature of the invention is that it can be made into a permanent pressure-sensitive paper by ensuring that the bonds created between the film and its companion light guide or backlight are permanent.

Another feature of the invention is that it allows easy insertion of background designs. By using a transparent pressure-sensitive film and a transparent light guide or backlight, an inserted background design sheet is visible to the user.

Another feature of the invention is that it is thin and lightweight in construction. This is achieved by using light ray modeling software to design the light guide, films, and high-flux LEDs.

Another feature of the invention is the low cost of manufacturing. Plastic injection molding allows high quality and low cost manufacturing of optical components, such as the present light guide and films, while maintaining the surface characteristics required to create Total Internal Reflection, the property that minimizes light loss prior to light being extracted into the pressure-sensitive film. Continual improvements in LED technology have resulted in brighter LEDs at lower cost.

BRIEF DESCRIPTION OF THE DRAWINGS

FIG. 2 is a side view showing the light guide with reflectors and other components.

FIG. 3 is a side view showing a two-sided light guide.

FIGS. 8a-1, 8a-2, and 8a-3 are 3 side views of an elastic light-extracting film and a composite light guide with an elastic upper surface, a middle layer of gel, and a lower layer of thin flexible film.

FIGS. 8b-1, 8b-2, and 8b-3 are 3 side views of a composite light guide with an elastic upper surface, a middle layer of gel, and a lower layer of thin flexible film.

DETAILED DESCRIPTION OF THE INVENTION, INCLUDING THE PREFERRED EMBODIMENT

Terminology

Figure 1:
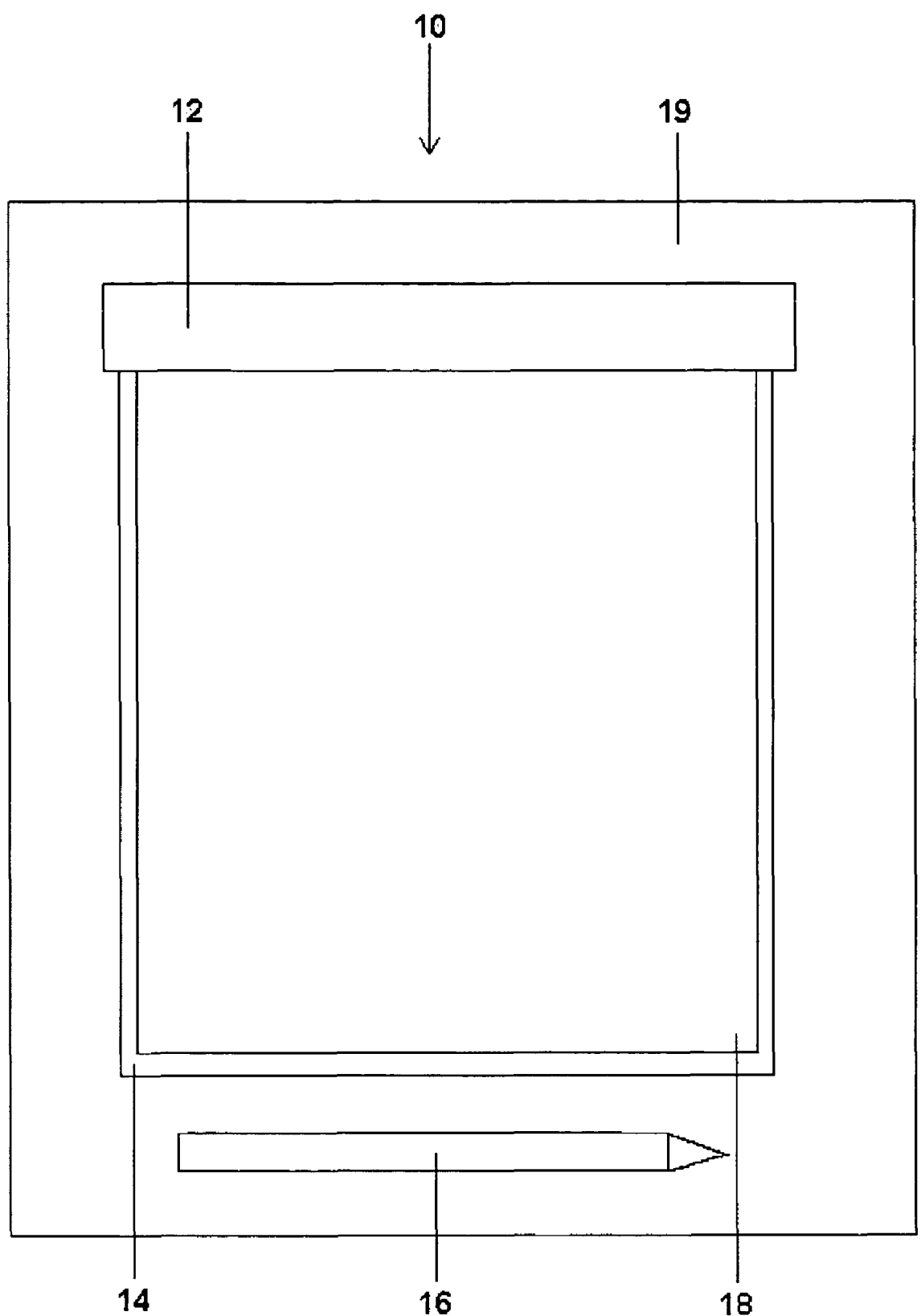
FIG. 1 is a top view of the present invention showing its major components.

The terminology and definitions of the prior art are not necessarily consistent with the terminology and definitions of the present invention. Where there is a conflict, the following definitions apply.

"Adapter backlight"—A special backlight that attaches to the display panel of a Modular Graphic Display Device. The adapter backlight is coupled to an array of light pipes of the display panel, thereby enabling the array of light pipes to provide edge illumination to the adapter backlight instead of the light guide of the Modular Graphic Display Device. A companion pressure-sensitive light-blocking film is disposed on the adapter backlight.

"Adapter light guide"—A special light guide that attaches to the display panel of the Modular Graphic Display Device. The adapter light guide is coupled to the array of light pipes of the display panel, thereby enabling the array of light pipes to provide edge illumination to the adapter light guide instead of the light guide of the Modular Graphic Display Device. A companion pressure-sensitive light-extracting film is disposed above the adapter light guide.

"Backlight"—A light guide with a diffusing surface to promote light emission. The backlight is generally illuminated by LEDs or Cold Cathode Fluorescent Lamps.

"Light-blocking film"—A pliable multi-layered film disposed on the backlight that enables light to be transmitted from the backlight when pressure is applied to the film. A layer in the film that contains fluorescent, luminescent, phosphorescent, or photochromic compounds will transmit and/or transform the transmitted light.

"Light-extracting film"—A pliable film disposed on the light guide that enables light to be extracted from the light guide when pressure applied to the film creates bonds between the light guide and the film. The bonds serve as the only extraction points for light in the light guide. The film will generally contain multiple layers.

"Light guide"—A light-transmitting plate that channels propagated light to illuminate the light-extracting film through bonds between the light guide and the film. In the absence of a light-extracting film, a light guide is a light-transmitting plate that channels propagated light to a marking surface through reflector ridges or reflective angles on a non-marking surface of the light guide. The light guide is preferably edge-illuminated by LEDs, and made of plastic. The light guide may contain a liquid or a gel.

"Light guide rim"—A four-sided light channel in contact with the four edges of the light guide for channeling light from the LEDs to the four edges of the light guide to facilitate uniform light extraction.

Operation

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

Referring now to the drawings, FIG. 1 shows the present invention 10 comprised of a light source 12, light guide or backlight 14, marking instrument 16, drawing surface 18, and a cardboard backing 19. Marking instruments include a stylus or any other pressure-applying device, including a stamp or a print head, such as a dot matrix print head.

Figures 1, 8A:
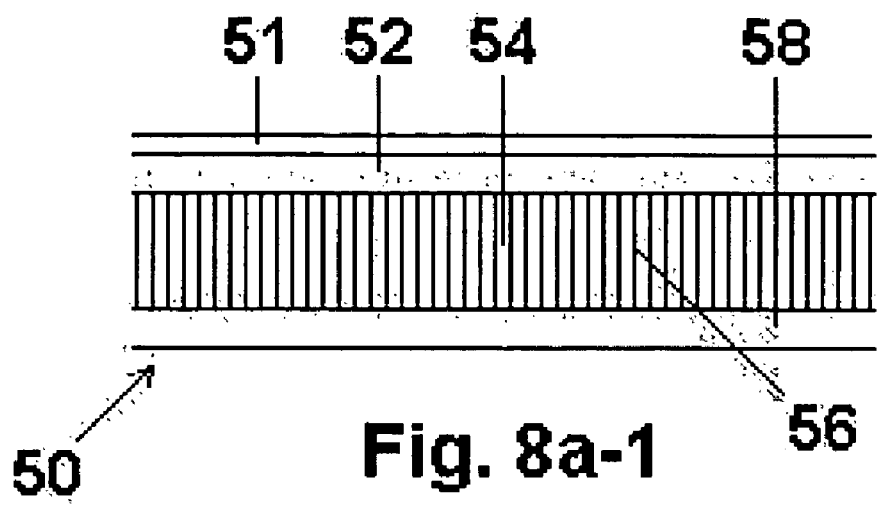
Figures 2, 8A:
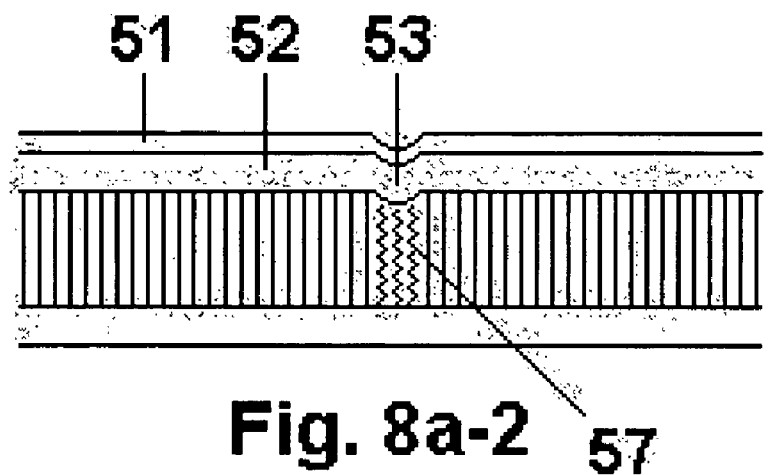

FIG. 2 shows a light guide 20 disposed on a cardboard backing 19. Between the light guide 20 and the light-extracting film 24 is a layer of air 22. Light can travel within a light guide made of plastic without emission due to the principal of Total Internal Reflection (TIR). A smooth surface is required in a light guide to maintain TIR. A layer of air between the light guide and the light-extracting film preserves the smooth surface of the light guide and thus maintains TIR. A bond between the light guide and the film breaks the smooth surface of the light guide and results in light being extracted from the light guide. LEDs 97 are either white light or of different colors. LEDs 97 are powered by power source 98 providing edgewise illumination to light guide 20. Brightness can be varied by controlling the intensity of the light source.

The light guide is designed using light ray modeling software for minimum light loss and uniform brightness for specific LEDs as light sources. The upper surface, or receiving surface, of the light guide bonds with the lower surface, or positioning surface, of the light-extracting film to provide light extraction from the light guide. A sticky optical (light transmitting) layer, such as paraffin or silicon, may be applied to the upper surface of the light guide. Alternatively, the sticky optical layer may be applied to the lower surface of the light-extracting film. The lower surface of the light guide may be reflective. A reflective layer may be formed by having reflectors or a reflective texture 21, or a reflective coating, to promote light extraction and uniform illumination, or any structure that sufficiently changes the angle of propagated light to exit from the light guide. The light guide may be composed of a hard, solid or semi solid, optical (light transmitting) material.

The light guide can be transparent, semi-transparent, clear, colored, or multi-colored. Coupling mechanisms with individual LEDs are provided for edge illumination of the light guide. This may include a light guide rim that provides edge illumination to the light guide at all four edges to facilitate uniform light extraction. The composition, thickness, and pliability of the light guide will vary depending on the intended application. It is designed for low-cost manufacturing through plastic extrusion or injection molding.

When the light guide and light-extracting film are substantially clear, a rigid plate containing a background design for tracing may be placed behind the light guide.

Figures 3, 8A:
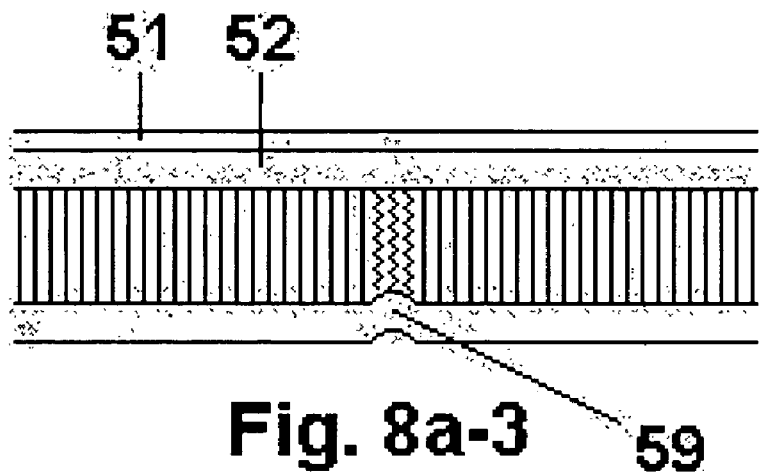

FIG. 3 shows a two-sided light guide 20a for use in a two-sided pressure-sensitive drawing tablet. Between the upper and lower half of the light guide is a cardboard backing 19a. Light from LED 97, powered by power source 98, is propagated between the two halves of the light guide through reflectors 21a at the two ends. A layer of air 22 separates the two halves of the light guide from their respective light-extracting films 24. A slot may be provided for insertion of a background design sheet. A two-sided drawing tablet is useful as an outdoor sign or where a drawing or writing needs to be displayed in opposite directions.

Figure 4:
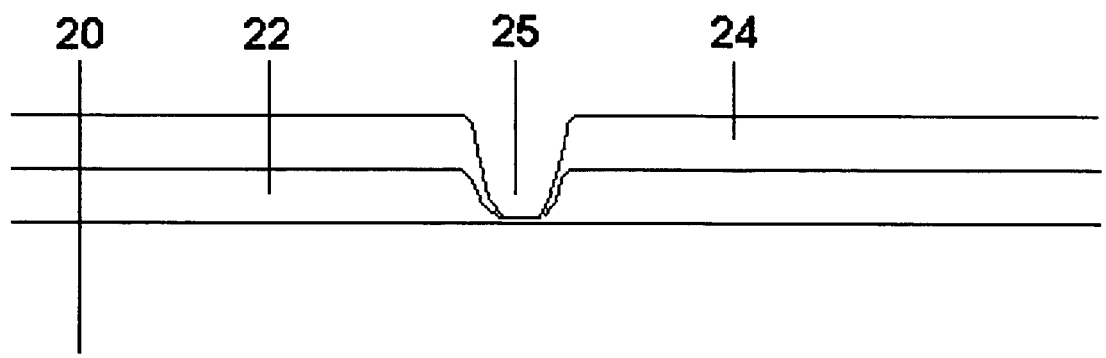
FIG. 4 is a side view showing the diffusing surface formed by a bond between the light-extracting film and the light guide.

FIG. 4 shows light being extracted from a light guide 20 through a light-extracting point 25. Such a light-extracting point is formed when pressure from a stylus depresses the light-extracting film through the layer of air 22 to form a bond with the light guide. The bond maintains TIR within the light guide without incurring Fresnel light loss. In this way, drawing on the tablet with a stylus has the effect of drawing lines of light.

Figure 5:
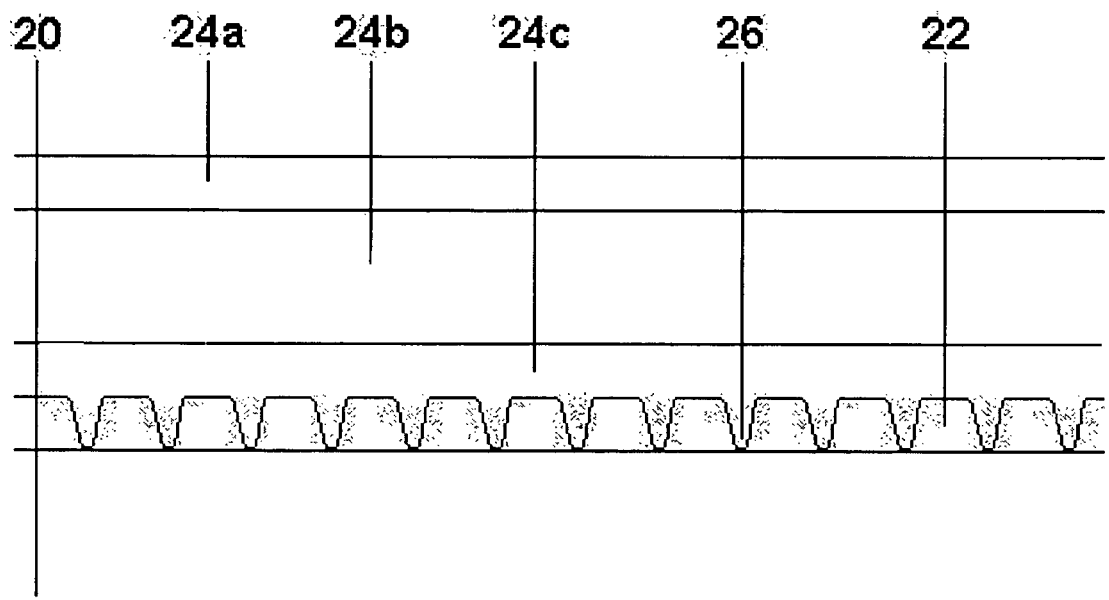
FIG. 5 is a side view showing the three layers of a light-extracting film with micro-bumps.

FIG. 5 shows a light guide 20 disposed below a light-extracting film comprised of three layers. The upper layer 24a of the film is designed to promote light emission through a diffusing surface. A light-transmitting middle layer 24b transmits and/or transforms and/or manipulates extracted light.

The lower layer 24c is designed to maintain a layer of air 22 between the light guide and the light-extracting film in order to preserve TIR within the light guide. The lower layer adheres to the light guide upon application of pressure and extracts light from the light guide.

To maintain a layer of air between the light-extracting film and the light guide, and to facilitate bonding between the film and the light guide when pressure is applied from a stylus, the lower layer 24c may have micro-bumps 26 or any other protruding or textured structure that maintains a layer of air between the film and the light guide. The lower layer may have a contact layer (in a multi-layer film) composed of an adhesive optical (light transmitting) material including pliable plastics, such as low-density polyethylene or any other material that can establish a temporary optical adhesion to the light guide, such as a paraffin or silicon compound.

In addition to micro-bumps, the lower layer 24c may also have light-extracting micro-dots to form the bonds between the film and the light guide when pressure is applied from a stylus. The micro-dots may be any protruding structure, in any arrangement, capable of extracting light from a light guide. That is, the only bonds formed between the light-extracting film and the light guide are the bonds formed between the light-extracting micro-dots and the light guide. This will allow light within the light guide to propagate past a line of light-extracting micro-dot bonds, thereby providing sufficient light to other areas within the light guide where light can be extracted through other micro-dot bonds formed in that area. Visually, the line of light created when pressure is applied from a stylus is a "halftone" line, or a line of dots of light.

Drawings on the light-extracting film may be erased by breaking the bonds between the film and the light guide. There are many ways to break the bonds between the film and the light guide such as by peeling back the film from the light guide, by a spring-loaded mechanism, by an air knife to lift the film, by a slider having a lifting blade under the film, and so forth. Alternatively, the drawing on the light-extracting film may be made permanent when a permanent or difficult-to-break bond is established between the film and the light guide.

To minimize line distortion when pressure is applied, the light-extracting film may be composed of a hard plastic upper layer, such as polyester, plus one or more sub-layers to establish and maintain an optical adhesion to the light guide. The light-extracting film may also include a protective marking surface. The film may also contain an integrated light guide via a permanent bonding between the film and the light guide. The light-extracting film is designed for low-cost manufacturing through plastic extrusion, injection molding, or cast-film process.

Other Embodiments

Another embodiment of the present invention is to use a light-extracting film with a middle layer 24b containing one or more fluorescent, luminescent, phosphorescent, or photochromic compound, as shown in FIG. 5. A distinct color and/or luminescence appears when the film is exposed to extracted light of activating wavelength, e.g. ultraviolet light. Disposed on this layer of film may be an optical bandpass filter that blocks light of activating wavelength, e.g. ultraviolet light being filtered to prevent photochromic activation from exposure to sunlight.

Color change or luminescence in the film will be sustained as long as exposure to light of activating wavelength is maintained through temporary or permanent adhesion to the light guide. Adding a source of visible light to an existing light of activating wavelength will intensify and/or change the color of the resultant emitted light. Erasure is accomplished by breaking the bond between the light guide and the light-extracting film, such as by peeling away the film from the light guide or by other means. Erasure of drawings or writings on a fluorescent or photochromic film can also be accomplished by turning off the LED light source. For certain phosphorescent and photochromic films, using LEDs of deactivating wavelengths will also erase the drawing or writing on the film.

Figure 6:
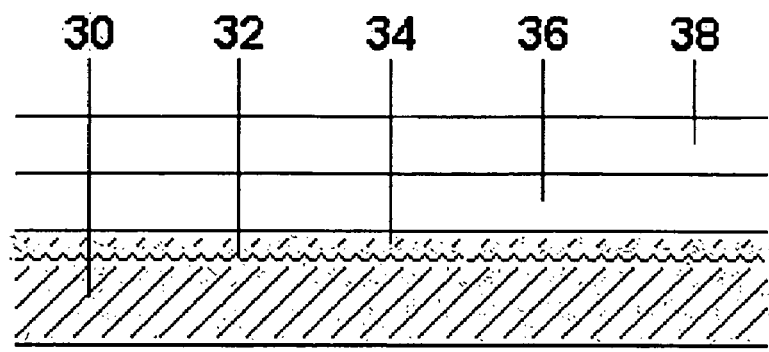
FIG. 6 is a side view showing a light guide with a diffusing upper surface and a layer of gel having an index of refraction sufficient to maintain TIR within the light guide.

Referring to FIG. 6, another embodiment of the present invention is to use a light guide 30 with a diffusing upper surface 32 above which is disposed a layer of gel 34 with an index of refraction sufficient to maintain TIR within the combined light guide 30 and layer of gel 34. A layer of air 36, or other compressible material with an index of refraction sufficient to maintain TIR within the combined light guide 30 and layer of gel 34 as a single layer, is disposed above layer of gel 34, and below a light-extracting film 38. When there is no pressure on light-extracting film 38, TIR is maintained within the combined light guide 30 and layer of gel 34 as a single layer. When pressure is applied to light-extracting film 38, a bond is formed between the lower surface of light-extracting film 38 and diffusing upper surface 32 of light guide 30. The diffusing upper surface enhances light extraction from the light guide.

Figure 7A:
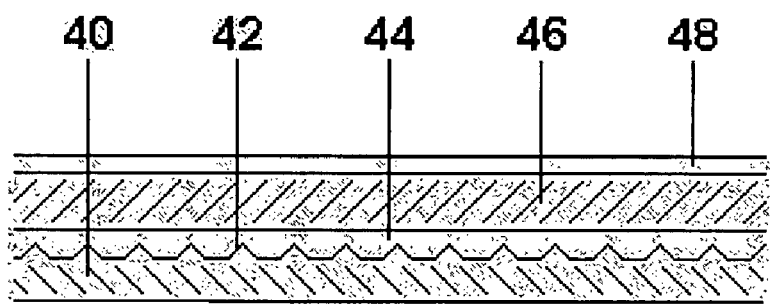
FIG. 7a is a side view showing a light-extracting film and a light guide with a moldable lower surface disposed above a reflecting layer with an upper surface of reflector ridges that promote light reflection into the light guide.

Referring to FIG. 7a, another embodiment of the present invention is to have a reflecting layer 40 with a surface of reflector ridges 42. A layer of air 44, or other compressible material with a low index of refraction sufficient to maintain TIR within light guide 46, is disposed between reflecting layer 40 and light guide 46. Disposed on light guide 46 is a light-extracting film 48. The surface of light-extracting film 48 in contact with light guide 46, is made of a material with an index of refraction sufficient to maintain TIR within light guide 46. Alternatively, this surface of light-extracting film 48 may be a separate layer. Light guide 46 is made of a moldable optical material that, under pressure, will conform to the shape of reflector ridges 42 facing light guide 46. Applying pressure on light guide 46 will create reflector shapes on the surface of light guide 46 facing reflector ridges 42, thereby reflecting light upward through light guide 46.

Figure 7B:
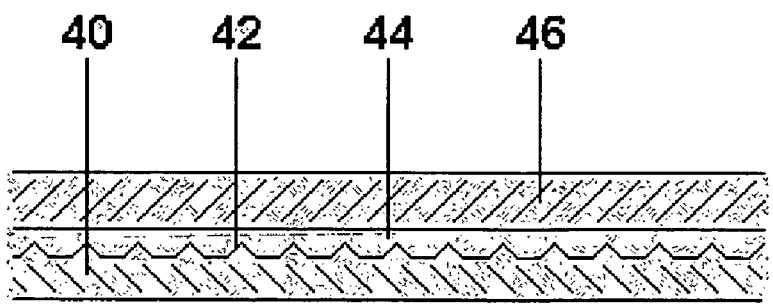
FIG. 7b is a side view showing a light guide with a moldable lower surface disposed above a reflecting layer with an upper surface of reflector ridges that promote light reflection into the light guide.

Referring to FIG. 7b, another embodiment of the present invention is to have a reflecting layer 40 with an upper surface of reflector ridges 42. A layer of air 44, or other compressible material with a low index of refraction sufficient to maintain TIR within light guide 46, is disposed between reflecting layer 40 and light guide 46. In contrast to the embodiment in FIG. 7a, the embodiment in FIG. 7b contains no light-extracting film. The light guide is made of a moldable optical material that, under pressure, will conform to the shape of reflector ridges 42 facing light guide 46. Applying pressure on light guide 46 will create reflector shapes on a surface of light guide 46 facing reflector ridges 42, thereby reflecting light upward through light guide 46. Light guide 46 may also include a protective marking surface.

Another embodiment of the present invention is shown in FIG. 8a-1 where an elastic light-extracting film 51 is disposed on a composite light guide 50 comprised of an elastic layer 52, a layer of gel 54 with an index of refraction sufficient to maintain TIR within the composite light guide, and a layer of thin flexible film 58. Disposed within layer of gel 54 is a honeycombed grid or mesh of vertical support pins 56 that crumple when pressure is applied to elastic layer 52 of composite light guide 50. Vertical support pins 56 are any device or structure capable of being compressed or crumpled. Referring to FIG. 8a-2, when pressure is applied through a stylus to elastic light-extracting film 51 and light guide layer 53, vertical support pins 57 crumple beneath the area where the stylus applies pressure. Referring to FIG. 8a-3, when the stylus is lifted, elastic light-extracting film 51 and light guide layer 52 substantially return to their original un-compressed shape. This causes flexible film 58 to form a crimp 59 or light reflective angle, thereby reflecting light upward through light guide 50.

Figures 1, 8B:
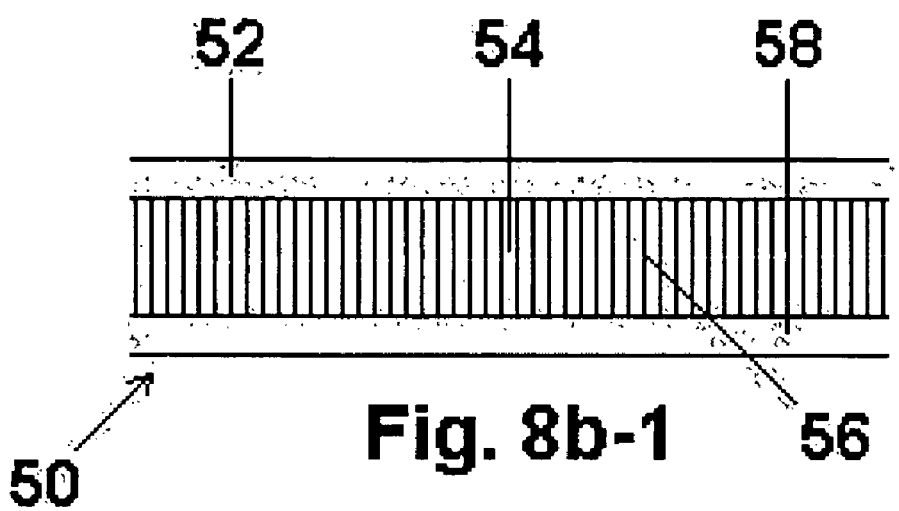
Figure 8B:
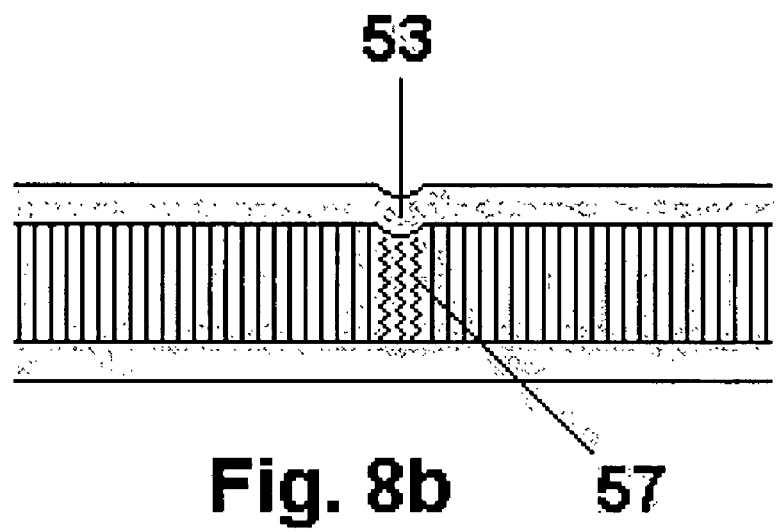
Figures 3, 8B:
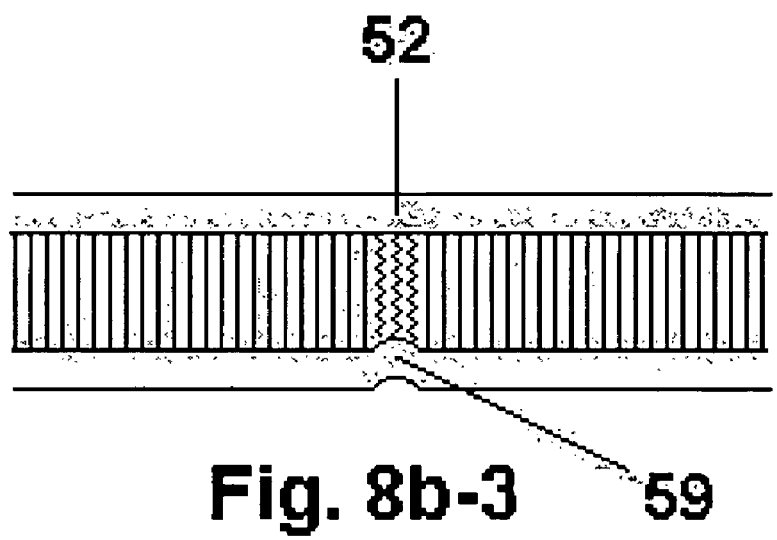

Another embodiment of the present invention is shown in FIG. 8b-1 where a composite light guide 50 is comprised of an elastic layer 52, a layer of gel 54 with an index of refraction sufficient to maintain TIR within composite light guide 50, and a lower layer of thin flexible film 58. In contrast to the embodiment in FIG. 8a-1, the embodiment in FIG. 8b-1 contains no light-extracting film. Disposed within layer of gel 54 is a honeycombed grid or mesh of vertical support pins 56 that crumple when pressure is applied to the elastic layer 52 of the light guide 50. Referring to FIG. 8b-1, when pressure is applied through a stylus to layer 53, vertical support pins 57 crumple beneath the area where the stylus applies pressure. Referring to FIG. 8b-2, when the stylus is lifted, elastic layer 52 returns substantially to its original un-compressed shape. This causes the flexible film to form a crimp 59 or light reflective angle, thereby reflecting light upward through light guide 50. Light guide 50 may also include a protective marking surface.

Figure 9:
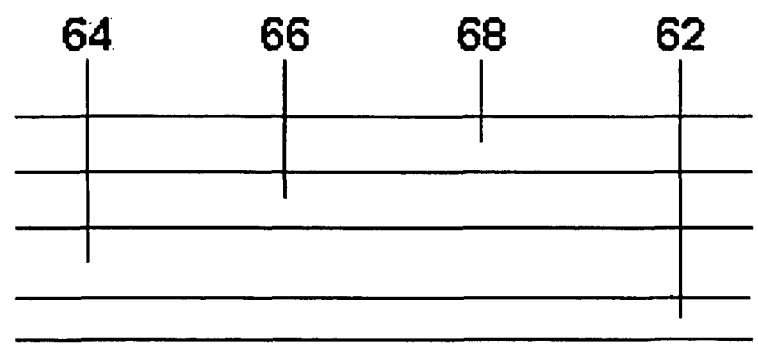
FIG. 9 is a side view of a pressure-sensitive light-emitting "paper".

Another embodiment is to make the drawing surface a light guide paper 60 as shown in FIG. 9. A light guide "paper" is a relatively thin marking or writing medium made with a light guide or a backlight. Since light guides and backlights can be as thin as several millimeters or less, such a marking medium, in appearance and use, can be similar to a piece of paper. This paper may be constructed very thin and flexible, or may be constructed as a rigid sheet composed of a light guide 64 integrated with a light-extracting film 68. A cardboard backing 62, or other rigid material, may be used to support the paper. TIR is maintained within light guide 64 by inflating or trapping air 66 between light guide 64 and the light-extracting film 68. The paper may be colored, and may contain fluorescent, luminescent, phosphorescent, or photochromic compounds. Special tablets are designed to hold sheets of paper, or a roll of paper, and to provide a coupling mechanism with LEDs for edge illumination. When the paper is substantially clear, a rigid plate containing a background design for tracing may be placed behind the light guide paper, or between sheets of paper in a tablet. The paper may also include a protective marking surface. The paper is designed for low-cost manufacturing through plastic extrusion or cast-film process.

Figure 10:
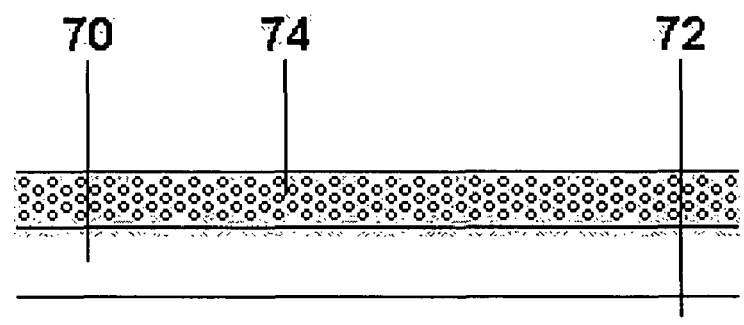
FIG. 10 is a side view of a light-blocking film containing air bubbles.

Another embodiment is to use a backlight and a companion light-blocking film in place of a light guide and a companion light-extracting film. A backlight is a light guide with a diffusing upper surface to promote light emission. The backlight is generally illuminated by LEDs or Cold Cathode Fluorescent Lamps. FIG. 10 shows a backlight 70 supported by a cardboard backing 72. Disposed on the backlight is a light-blocking film 74. Such a combination may be constructed as a relatively thin writing or marking medium that can be described as a paper.

When pressure is applied and the light-blocking film 74 is compressed, light is transmitted from the backlight due to a change in the film from opaque or semi-opaque to transparent or semi-transparent. Thus adhesion is not required to transmit light, and a backlight is used instead of a light guide. The non-adhesive pressure-sensitive light-blocking film may be colored, and may contain fluorescent, luminescent, phosphorescent, or photochromic compounds.

An example of a light-blocking film containing air bubbles 74 is shown in FIG. 10. Applying pressure on the film with a stylus will break the air bubbles and allow light to be transmitted from the backlight through the film.

Figure 11:
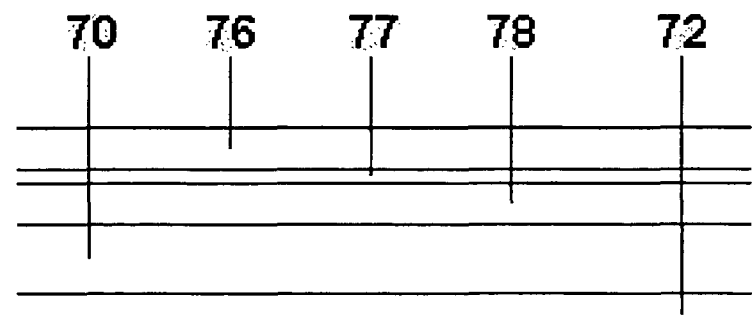
FIG. 11 is a side view of a light-blocking film comprised of two layers of film with a layer of opaque viscous liquid disposed between the two layers.

Another example of a light-blocking film is shown in FIG. 11 where a light guide 70 is supported by a cardboard backing 72. The light-blocking film is comprised of two layers of film, 76 and 78, with a layer of opaque gel 77 disposed between the two layers. Applying pressure on the film with a stylus will disperse or move the opaque gel and allow light to be transmitted from the backlight through the film.

Another embodiment is to make any of the previous embodiments a drawing tablet add-on to the display device described in U.S. patent application Ser. No. 10/939,203 titled "Modular Graphic Display Device" filed on Sep. 10, 2004. This add-on provides a pressure-sensitive means to draw or write with a stylus or other pressure-applying device on a Modular Graphic Display Device by extracting light from an adapter light guide (as defined above) or by permitting light to be transmitted from an adapter backlight (as defined above). The add-on is comprised of any of: 1) an adapter light guide and a companion adhesive pressure-sensitive light-extracting film, 2) an adapter light guide with reflector ridges, 3) an adapter light guide with an elastic marking layer, or 4) an adapter backlight and a companion non-adhesive pressure-sensitive light-blocking film. The adapter light guide and its companion adhesive pressure-sensitive light-extracting film has the same planar dimensions, which can vary from the size of one tile to the size of the entire light guide plate. Likewise, the adapter light guide with reflector ridges, adapter light guide with an elastic marking layer, and adapter backlight and its companion non-adhesive pressure-sensitive light-blocking film will have the same planar dimensions, which can vary from the size of one tile to the size of the entire light guide plate. After inserting the drawing tablet add-on onto the light guide plate of a Modular Graphic Display Device, a user can create a drawing or writing on the pressure-sensitive film. A user may insert tiles together with the drawing tablet add-on on the same light guide plate. For example, an add-on containing a caricature drawing of a person may be placed at the center of the light guide plate with colored tiles serving as matting around the add-on drawing.

Figure 12:
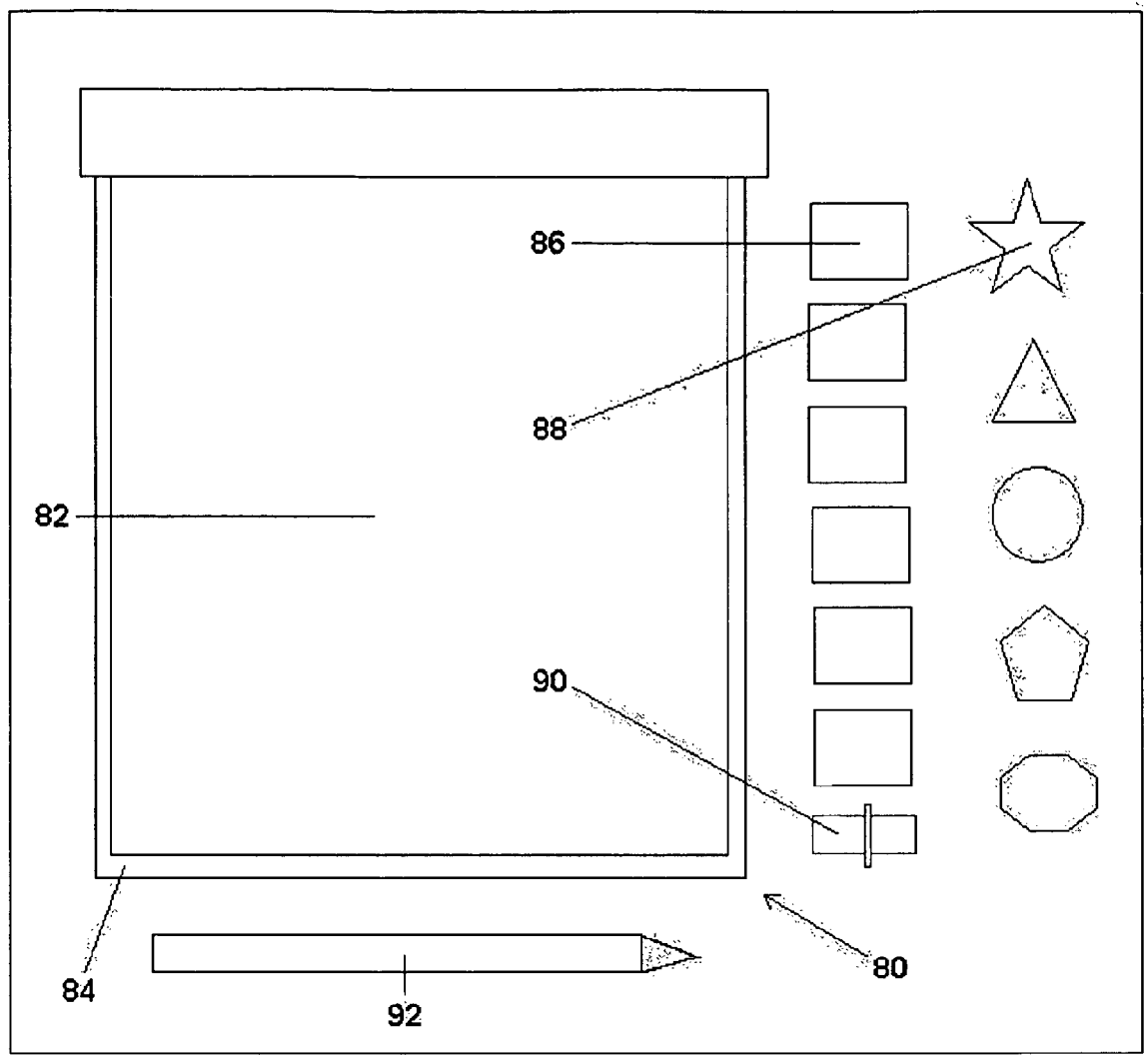
FIG. 12 is a top view of the present invention as a toy drawing tablet with color buttons and stencil stamps.

Another embodiment is to make the present invention a toy drawing tablet. FIG. 12 gives a top view of a toy drawing tablet 80 comprised of a drawing surface 82, a background design 84 disposed behind drawing surface 82, color buttons 86, stencil stamps 88, and a color intensity switch 90. Each color button turns on an LED of a specific color. Stencil stamps are used to create drawings of different shapes to complement drawings made with the stylus 92. The background design may contain alphabets and numerals for children to trace. Other designs may contain drawings of popular toy figures, book characters, and heroes from comic books, cartoons, and movies.

As a way to attract attention to a drawing or writing, a separate power control device can be used to control the light source for the drawing. This power control device can cause the drawing to blink randomly or at prescribed time intervals.

It is to be understood that the above descriptions and embodiments are intended to be illustrative, and not restrictive. Additional embodiments will be apparent to those of skill in the art upon reviewing the above descriptions. The scope of the invention should, therefore, be determined with reference to the following claims, along with the full scope of equivalents to which such claims are entitled.

The invention claimed is:

1. A device for making illuminated markings, the device comprising:
    a light guide plate comprising an optical material having a first surface and an opposing second surface sufficient to establish total internal reflection within the light guide plate;
    a light source optically coupled with the light guide plate such that light from the light source travels within the light guide plate due to the principle of total internal reflection; and
    a film mounted to the first surface of the light guide plate, wherein the film and the light guide plate are separated by a layer of air, such that an application of pressure to the film causes the film to displace air and bond with the first surface of the light guide plate at a bonded area, wherein the bonded area of the film to the light guide plate disrupts total internal reflection within the light guide plate, enabling light from the light guide plate to pass into the film, resulting in illumination of the bonded area of the film.

2. The device of claim 1 wherein the light guide plate and the film are integrated to form a composite.

3. The device of claim 2, wherein the composite is flexible.

4. The device of claim 1, wherein the film includes a protective marking surface.

5. The device of claim 1, wherein the light guide plate has a diffusing surface on the first surface.

6. The device of claim 1, wherein the film includes a photo-activated compound, wherein the photo-activated compound is activated by the light source.

7. The device of claim 6 wherein the photo-activated compound is selected from the group consisting of a fluorescent compound, a luminescent compound, a phosphorescent compound, and a photochromic compound.

8. The device of claim 1, wherein the light source comprises at least one light emitting diode.

9. The device of claim 1 further comprising a color control for changing the color of the light.

10. The device of claim 1 further comprising a light intensity control for varying the brightness of the light.

11. The device of claim 1 wherein the film is removably bonded to the light guide plate.

12. A method for manufacturing a pressure-sensitive light-extracting device for making illuminating markings, the method comprising:
    fabricating a light guide plate having a first surface and an opposing second surface sufficient to establish total internal reflection within the light guide plate;
    optically coupling a light source with the light guide plate for illuminating the light guide plate with light at an angle of incidence relative to the first surface and the second surface, the angle of incidence being within a critical range of angles of incidence sufficient to promote total internal reflection of the light within the light guide plate; and
    mounting a film to the first surface of the light guide plate wherein the film and the light guide plate are separated by a layer of air, such that an application of pressure causes the film to bond with the light guide plate at a light-extracting point on the first surface of the light guide plate, wherein the bond between the film and the light guide plate alters the critical range of angles of incidence at the light-extracting point sufficient to extract total internally reflected light from the light guide plate and into the film at the light-extracting point.

13. The method of claim 12 further comprising forming a composite by integrating the light guide plate and the film.

14. The method of claim 13, further comprising forming a sheet tablet for receiving sheets of the composite and for providing edge illumination to the light guide plate of the composite.

15. The method of claim 14, further comprising making a rigid plate for separating sheets of the composite and for holding a background design for tracing on the sheet tablet.

16. The method of claim 13, further comprising forming a roll tablet for holding a roll of the composite and for providing edge illumination to the light guide plate.

17. The method of claim 16, further comprising making a rigid plate for holding a background design for tracing on the roll tablet.

18. The method of claim 13, wherein the composite is flexible.

19. The method of claim 13, wherein the composite is rigid.

20. The method of claim 12 further comprising forming a protective marking surface on the film.

21. The method of claim 12 further comprising forming a diffusing surface on the first surface of the light guide plate.

22. The method of claim 12 wherein the light guide plate and the film are optically clear.

23. The method of claim 12 wherein the film includes a photo-activated compound.

24. The method of claim 23 wherein the photo-activated compound is selected from the group consisting of a fluorescent compound, a luminescent compound, a phosphorescent compound, and a photochromic compound.

25. The method of claim 12, wherein the film includes a band-pass filter.

26. The method of claim 12, wherein the light source comprises at least one light emitting diode.

27. The method of claim 12 further comprising a reflective feature on the light guide plate to promote light extraction and uniform illumination.

28. The method of claim 27, wherein the reflective feature includes a reflective texture.

29. The method of claim 27, wherein the reflective feature includes a reflective coating.

30. The method of claim 12 wherein the film is removably bonded to the light guide plate.

* * * * *